United States Patent [19]
Brereton et al.

[11] 4,212,662
[45] Jul. 15, 1980

[54] METHOD OF HEATING GLASS SHEETS FOR CONVEYING

[75] Inventors: Paul A. Brereton, Moseley; Roger Challis, Northfield, both of England

[73] Assignee: Triplex Safety Glass Company Limited, Birmingham, England

[21] Appl. No.: 426

[22] Filed: Jan. 2, 1979

[30] Foreign Application Priority Data

Jan. 12, 1978 [GB] United Kingdom ............... 1275/78

[51] Int. Cl.² ............................................. C03B 23/02
[52] U.S. Cl. ....................................... 65/106; 65/104
[58] Field of Search ................... 65/103, 104, 106, 107

[56] References Cited
U.S. PATENT DOCUMENTS

| 3,245,772 | 4/1966 | Cypher et al. | 65/106 X |
| 3,396,000 | 8/1968 | Carson et al. | 65/104 |
| 3,522,029 | 7/1970 | Carson et al. | 65/106 X |
| 3,880,635 | 4/1975 | Jack et al. | 65/104 X |

Primary Examiner—Arthur D. Kellogg
Attorney, Agent, or Firm—Burns, Doane, Swecker & Mathis

[57] ABSTRACT

In a method of heating a glass sheet which is moved on a conveyor which contacts one face of the sheet, anticlastic bending of the sheet is caused, and the stable anticlastic shape of the sheet is determined such that the sheet is arched away from the conveyor transversely of the sheet with respect to the conveying direction and with the sheet having a reverse curvature along its longitudinal extent so that the leading and trailing edges of the sheet are bent away from the conveyor. This reduces the contact between the contacted surface of each glass sheet and keeps the leading edge of each sheet clear of the conveyor. Anticlastic bending of the sheet is caused by producing a temperature differential between the central area and at least a part of the periphery of the sheet, for example, by heating said part of the periphery.

10 Claims, 4 Drawing Figures

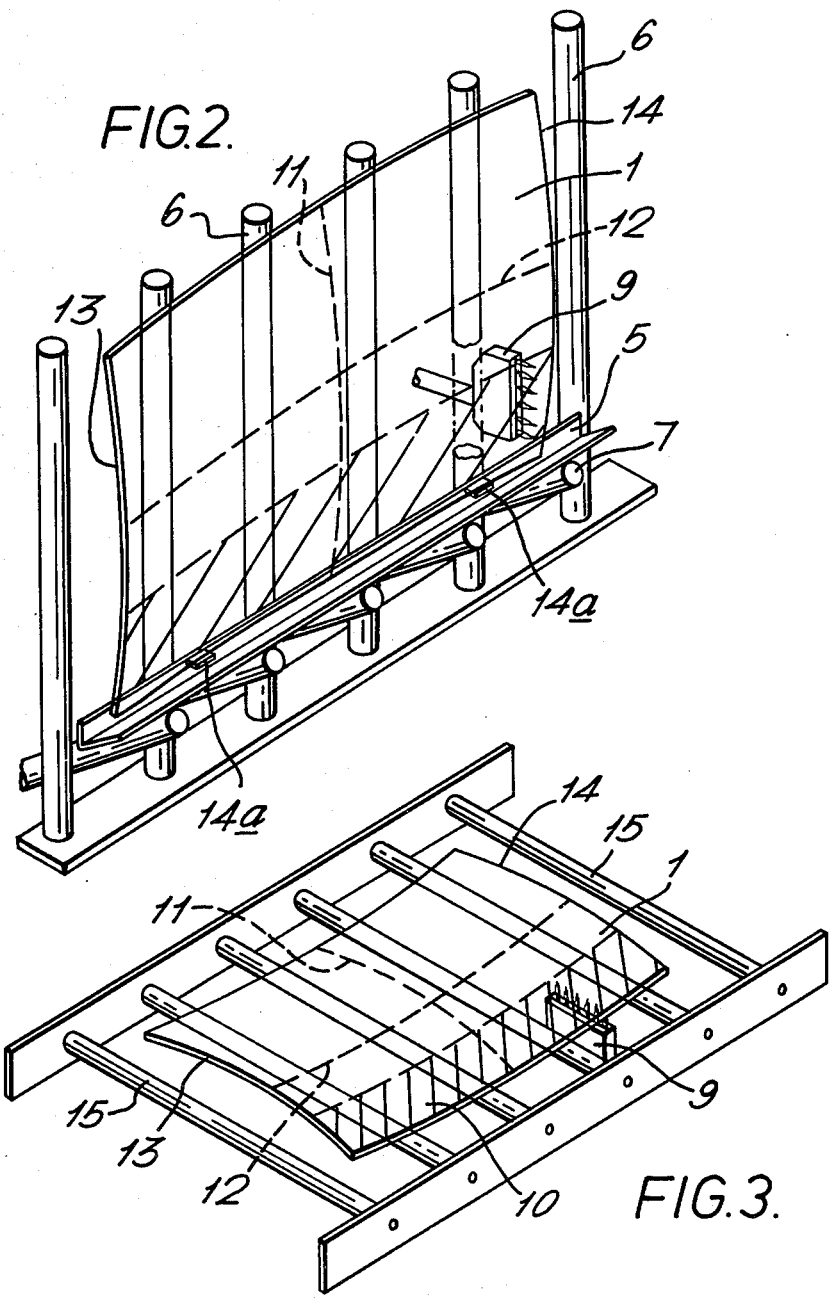

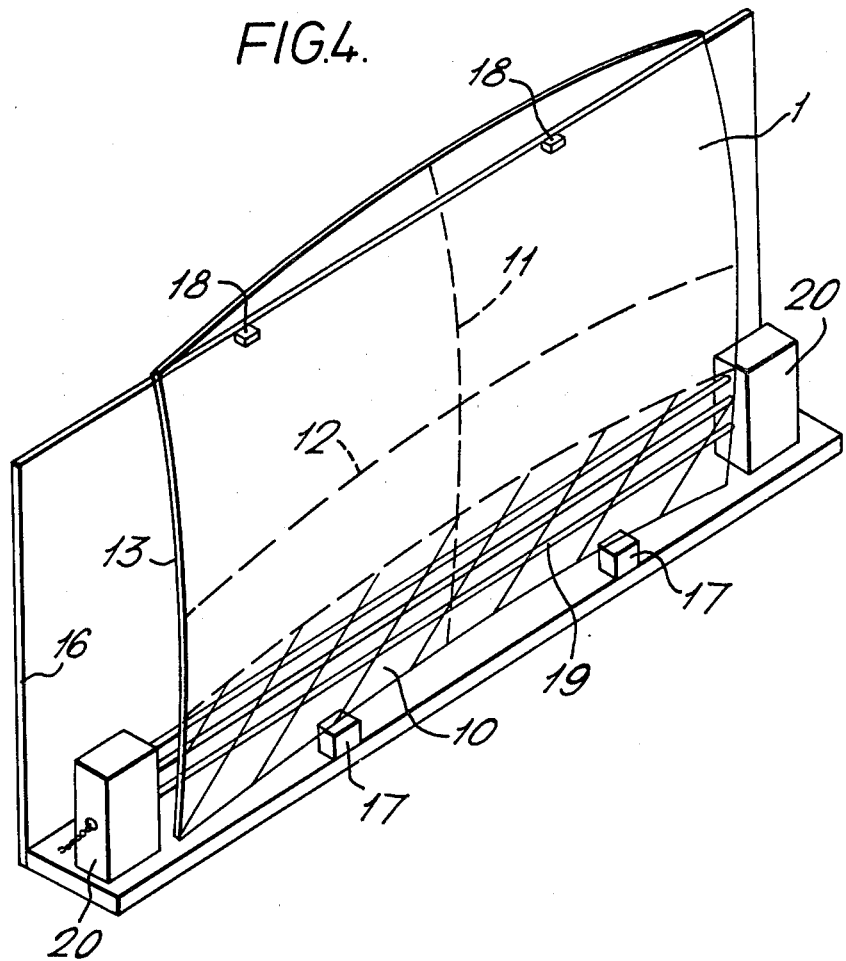

METHOD OF HEATING GLASS SHEETS FOR CONVEYING

BACKGROUND OF THE INVENTION

This invention relates to heating glass sheets and in particular to a method of heating glass sheets which are moved on a conveyor which contacts one face of each sheet. The method is particularly suitable for heating of glass sheets to a temperature suitable for further processing such as bending and/or thermal toughening of the sheets.

Glass sheets may be heated while conveyed through a furnace on a horizontal roller conveyor comprising spaced parallel horizontal rollers. Glass sheets may also be conveyed through a furnace in a near vertical position with the bottom edge of each sheet on a support carriage and the sheet leaning against upright support rollers which are inclined at a small angle to the vertical.

It has been found that when a glass sheet is in a heat-softened condition approaching the final desired thermal condition of the sheet the contacted surface of the glass sheet is susceptible to damage or distortion by contact with the conveyor rollers. In addition, there can be a tendency for damage to the leading edge of the glass sheet because it does not ride smoothly over the rollers of the conveyor when it is in a heat softened condition. The leading edge of the sheet may even tend to trip-up on each of the rollers of the conveyor, whether horizontal or upright, as the glass sheet moves along the conveyor.

It is a main object of the present invention to reduce these problems by reducing the contact between the contacted surface of each sheet and the conveyor and by keeping the leading edge of each sheet clear of the conveyor as the sheet is being moved on the conveyor.

SUMMARY

According to the invention a method of heating a glass sheet which is moved on a conveyor which contacts one face of the sheet, comprises producing a temperature differential between the central area and at least a part of the periphery of the sheet to cause anticlastic bending of the sheet, and determining that the anticlastic shape of the sheet is stabilized such that said sheet is arched away from the conveyor transversely of the sheet with respect to the conveying direction and the sheet has a reverse curvature along its longitudinal extent so that the leading and trailing edges of the sheet are bent away from the conveyor.

In the stable anticlastic shape the sheet has opposite curvatures at any given point and is curved convexly along any longitudinal plane section in the direction of movement of the sheet so that both the leading and trailing edges of the sheet are bent away from the conveyor, and the sheet is bent concavely along any plane section at right angles to the direction of movement of the sheet so that the sheet is arched outwardly away from the conveyor so that at least the central part of the sheet does not contact the conveyor.

In an embodiment, the temperature differential is produced between the central area and at least part of the periphery of the glass sheet by cooling the central area of the glass sheet. Alternatively, the temperature differential can be produced by heating at least part of the periphery of the glass sheet. The stable anticlastic shape of the sheet can be determined by applying pressure to the sheet, for example, manually or by mechanical means.

In a further embodiment, the temperature differential is produced by heating the part of the periphery of the glass sheet, and the stable anticlastic shape of the sheet is determined by heating said part of the periphery to produce an initial predetermined temperature gradient across the thickness of the sheet at said part of the periphery.

One method of heating a glass sheet which is moved through a furnace, comprises, at the commencement of the heating of the sheet, heating an edge zone of the contacted face of the sheet in a manner to cause the anticlastic bending of the sheet and to determine said stable anticlastic shape of the sheet.

In the embodiment of the invention in which the sheet is being conveyed in an upright position the method comprises seating the lower edge of the sheet on a support carriage, leaning the sheet against upright support rollers which are inclined at a small angle to the vertical and which with said support carriage constitute the conveyor and heating a marginal band of the contacted face of the sheet to cause the anticlastic bending of the sheet and to determine the stable anticlastic shape of the sheet.

The heating of the marginal band of the contacted face of the sheet may be effected by moving the sheet on the conveyor past heating means located between the upright support rollers, preferably to heat a marginal band extending along the lower edge of the sheet.

In another way of operating an edge zone of the sheet is pre-heated before loading the sheet on to the conveyor.

The pre-heating of an edge zone of the sheet may be effected by supporting the sheet in proximity to radiant electrical heating elements which heat the edge zone of the sheet.

BRIEF DESCRIPTION OF THE DRAWINGS

In order that the invention may be more clearly understood some embodiments thereof will now be described, by way of example, with reference to the accompanying drawings in which:

FIG. 2 is an isometric view of a glass sheet bent to an anticlastic shape after it has moved past the heating means of FIG. 1, FIG. 3 is an isometric view of a glass sheet bent to anticlastic shape by the method of the invention while supported on a horizontal roller conveyor, and FIG. 4 illustrates pre-heating of an edge zone of a glass sheet before the sheet is loaded on to the conveyor.

DESCRIPTION OF THE PREFERRED EMBODIMENTS

Figure 1:
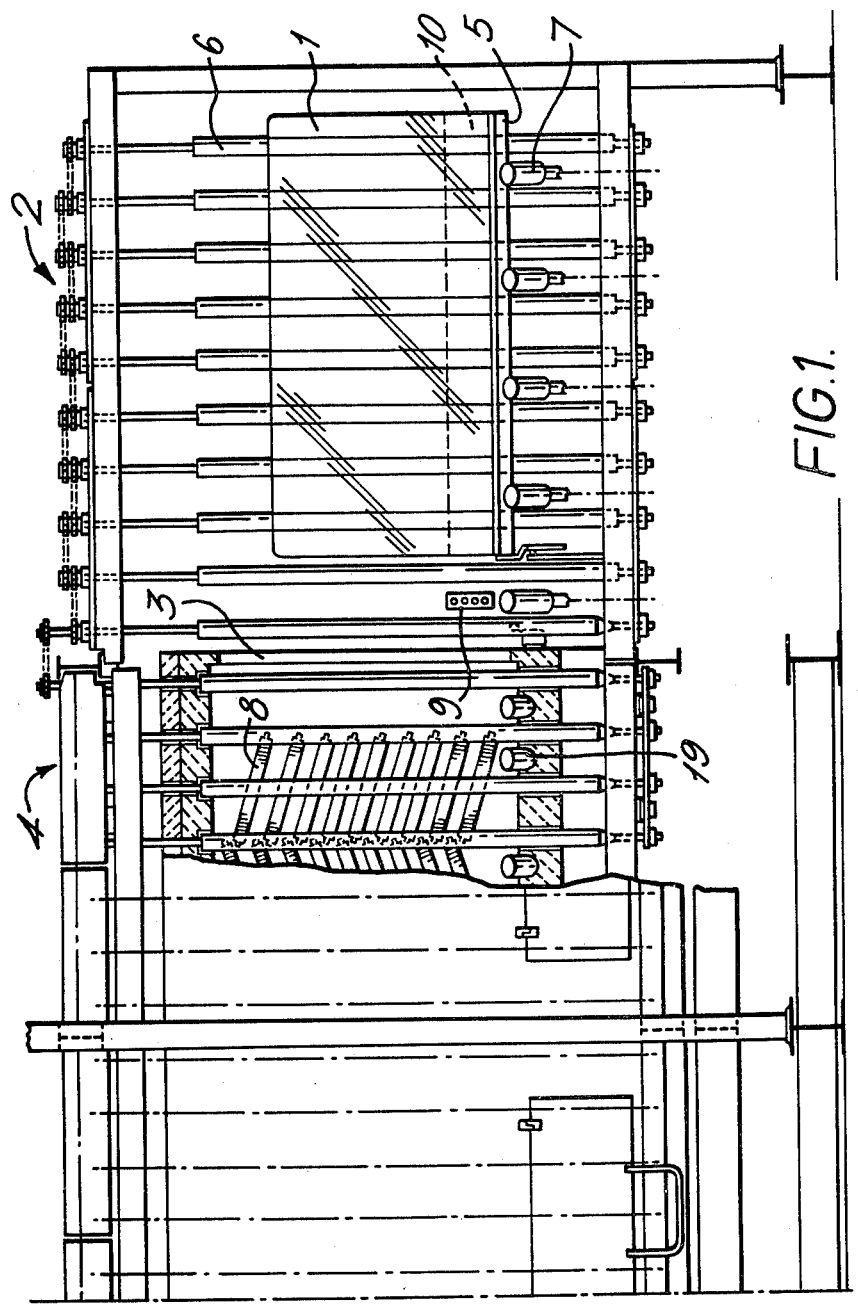
FIG. 1 is an elevation partly in section of the inlet end of a furnace showing a loading station for loading glass sheets on to an upright conveyor and heating means for heating an edge zone of the sheet as it is advanced into the furnace.

Referring to FIG. 1 a glass sheet 1 which is to be heated to a temperature suitable for bending and/or thermal toughening is supported in an upright position at a loading station 2 leading to the inlet 3 to a furnace indicated generally at 4 through which the sheet is conveyed. The lower edge of the sheet 1 is seated on a support carriage 5 and the sheet 1 leans against upright support rollers 6 which are inclined at a small angle to the vertical and which with the support carriage constitute a conveyor which contacts one face of the sheet. This contact at the loading station is the leaning of the upper edge of the sheet against the rollers 6. The support carriage is carried by inclined stub rollers 7 which project upwardly at an angle through spaces between the upright rollers 6. The carriage 5 is of V-section as illustrated in FIG. 2. One face of the carriage rests on the stub rollers 7 and the other face bears against the upright rollers 6. The rollers 6 and 7 are driven at the same speed to advance the sheet on the carriage through the inlet 3 to the furnace.

In the furnace there are similar rollers 6 and 7 which support the carriage 5 as the sheet is conveyed through the furnace past heating elements 8 in the wall of the furnace which elements heat the sheet to the required temperature for bending and/or thermal toughening.

The conveyor and furnace of the kind illustrated in FIG. 1 is described in greater detail in United Kingdom Pat. No. 1,442,314 and the disclosure in that patent is incorporated herein by reference. A gas burner 9 is mounted between the two upright support rollers 6 nearest to the entrance 3 to the furnace. The burner 9 is positioned at a height above the stub rollers 7 so that it heats a lower marginal band 10 of the face of the glass sheet 1 contacted by the rollers 6. This heating of at least a part of the periphery of the sheet, being an edge zone of the contacted face of the sheet causes expansion of the glass of the lower marginal band 10 while the rest of the glass sheet has not been heated. This causes the sheet to deform slightly to accommodate the expansion of the band 10 and the sheet bends to an anticlastic shape having opposite curvatures at any given point on the sheet. Heating of the band 10 can cause the glass sheet to take up either one of two stable anticlastic shapes, that is, with the sheet bent concavely or convexly in its direction transverse to the conveying direction, and bent convexly or concavely longitudinally. It is required that the sheet takes up the stable anticlastic shape illustrated in FIG. 2, that is, with the sheet bent concavely away from the rollers in its transverse direction and convexly away from the rollers longitudinally. Thus, the sheet is bent concavely away from the rollers 6 in any upright plane section of the sheet as indicated by the line 11 in FIG. 2, and is bent convexly away from the rollers 6 in any longitudinal plane section in the direction of advance of the sheet as indicated by the line 12. The anticlastic shape is determined in the illustrated embodiment by heating the face of the sheet which contacts the rollers by the burner 9 to a predetermined initial temperature gradient. This initial gradient will persist, in glass 2.3 mm thick, only for about one second. The face nearer to the burner 9 will for this short time be hotter than the opposite face, and being hotter will expand more and tend to curve away from the burner 9, that is, will be concave with respect to the burner 9. In this way, the sheet will take up the required stable anticlastic shape.

This means that at least the central portion of the sheet will be arched away from the rollers thereby minimizing the contact between the contacted face of the sheet and the rollers, and that both the leading edge 13 and the trailing edges 14 of the sheet are bent away from the rollers 6.

The sheet assumes this anticlastic configuration as it is being advanced through the entrance 3 to the furnace and the nature of the supports 14a on the carriage 5 for the lower edge of the sheet permits this curvature to be adopted without offering resistance. The heating of the lower marginal band 10 of the sheet may for example raise the temperature of the face of that band of the sheet which faces the rollers 6 by 50° C. When the sheet is a sheet of soda-lime-silica glass cut for example to shape required for the manufacture of a motor vehicle windscreen the amount of the anticlastic bending of the sheet is such that any extraneous mechanical forces or vibrations exerted on the sheet in the furnace during its heating or any non-uniformity in heat transfer conditions which the sheet might encounter in the furnace are insufficient to cause the sheet to change from the stable anticlastic state illustrated with reference to FIG. 2 to the opposite stable anticlastic state.

The heating of the face of the glass facing the conveyor rollers ensures that the glass has taken up the desired stable state and long after the initial temperature gradient through the thickness of the lower marginal zone 10 of the glass, for example a temperature difference of 50° C., has collapsed the glass remains in the desired anticlastic state by virtue of the area temperature distribution which remains throughout the heating of the glass in the furnace.

The arching of the sheet across its height as indicated by the line 11 means that the centre part of the glass sheet is arched away from contact with the rollers 6. This means that contact of the face of the sheet with the rollers is minimal throughout the passage of the sheet through the furnace, and thus there is little risk that the face of the sheet will be damaged or distorted by the rollers particularly when the sheet is reaching the end of the furnace and is in heat-softened condition.

The bending of the leading edge 13 of the sheet away from the conveyor ensures that this leading edge does not trip up on the rollers 6 as the glass sheet is moved through the furnace, which is particularly advantageous when the sheet is reaching the end of the furnace and is in heat-softened condition.

FIG. 3 illustrates the application of the invention to a glass sheet which is being heated when conveyed through a furnace on a roller conveyor comprising horizontal driven rollers 15. FIG. 3 shows the loading section of the conveyor with a gas burner 9 placed between two of the rollers 15 so as to heat an edge zone of the undersurface of the glass sheet extending along one longitudinal edge of the sheet as the glass is moved by the conveyor past the burner 9. This edge zone is indicated at 10. The effect of this heating is to produce anticlastic bending of the sheet to the stable anticlastic shape in which the sheet is bent concavely away from the rollers 15 across the width of the sheet as indicated at 11 and is bent convexly relative to the rollers 15 along the length of the sheet as indicated at 12. There is therefore minimal contact between the face of the sheet and the rollers, and the leading edge 13 of the sheet is bent upwardly away from the rollers. This anticlastic shape of the sheet is maintained during the advance of the sheet on the conveyor through the furnace so that there is little damage or distortion caused to the face of the sheet by the rollers and there is no risk of the leading edge 13 of the sheet coming into contact with the rollers throughout the advance of the sheet through the furnace.

If desired the degree of curvature of the sheet may be enhanced by the use of two burners spaced apart either in the embodiment of FIG. 2 or the embodiment of FIG. 3 to heat edge zones extending along both longitudinal edges of the sheet.

The heating of any part of the periphery of the sheet at the commencement of the heating of the sheet can be sufficient to cause the required anticlastic bending of the sheet. The sheet may be heated for example in peripheral zones extending along either or both of the leading and trailing edges of the glass sheet. When heating these edges the surface of the glass sheet facing away from the rollers can be heated to provide the predetermined initial temperature gradient to produce the required anticlastic shape as illustrated in FIGS. 2 and 3.

An edge zone may be pre-heated before loading of the sheet on to the conveyor. FIG. 4 shows an arrangement for carrying out the pre-heating in which the glass sheet 1 is supported in a near vertical position on a frame 16 having bottom support feet 17 and upper support pads 18. An edge zone of the sheet is pre-heated, in this embodiment this edge zone being the lower longitudinal edge of the glass sheet by means of radiant electrical heating elements 19 which extend between junction boxes 20 mounted on the frame 16. Three parallel heating elements 19 are shown and these are positioned so that they heat a lower marginal band of the face of the sheet which is to contact the rollers of the conveyor. The sheet is therefore caused to bend anticlastically while it is still supported in the frame 16. The required anticlastic shape is illustrated in FIG. 4 and can be obtained by heating the band of the face of the sheet to produce the predetermined initial temperature gradient. The sheet with the required shape is lifted on to the conveyor, either on to the support carriage 5 leaning against the rollers 6 in the embodiment of FIGS. 1 and 2 or on to the horizontal support rollers 15 of the horizontal conveyor of FIG. 3.

If required, the stable anticlastic shape of the sheet required can be determined by applying pressure to the sheet, for example, manually, as the marginal band of the face of the sheet is heated.

When the glass sheet 1 is cut to the shape of a windscreen the heating elements 19 may be curved to match the shape of the lower edge of the glass sheet.

In the embodiments described above anticlastic bending of the sheet is caused by heating a part of the periphery of the sheet. However, to cause anticlastic bending of the sheet it is only necessary to produce a temperature differential between the central area of the sheet and a part of the periphery thereof. Thus, if required, the central area of the sheet can be cooled, for example, by directing jets of air thereagainst, to produce the necessary temperature differential and thereby cause anticlastic bending of the sheet.

The production of a temperature differential between the central area of the sheet and at least part of the periphery thereof to cause anticlastic bending of the sheet and the determination of the stable anticlastic shape in which the sheet is arched away from contact with the conveyor and in which the leading edge of the sheet is bent away from the conveyor ensures that there is little risk of damaging or distorting the face of the sheet by contact with the rollers of the conveyor. Further it is ensured that there is no risk of the leading edge of the sheet tripping on the rollers of the conveyor. The risk of damage of the sheet during its passage through the furnace while supported on the conveyor rollers is thereby minimised.

We claim:

1. In a method of advancing a glass sheet through contact of a conveyor therewith, the improvement comprising:
    heating a peripheral zone of the glass sheet at a rate to differentially heat said peripheral zone relative to the central area of the glass sheet to bend the sheet to a stable anticlastic shape in which said sheet is arched away from the conveyor transversely of the direction of advance of the sheet and in which said sheet has a reverse curvature along the direction of its advance whereby the leading and trailing edges of the sheet are bent away from the conveyor.

2. A method according to claim 1, wherein the said stable anticlastic shape of the sheet is determined by heating said peripheral zone to produce an initial predetermined temperature gradient across the thickness of the sheet at said peripheral zone.

3. A method according to claim 2, wherein said glass sheet is moved through a furnace, comprising at the commencement of the heating of the sheet in the furnace, heating a peripheral zone of one face of the sheet to cause the bending of the sheet to said stable anticlastic shape of the sheet.

4. A method according to claim 3, comprising seating the lower edge of the sheet on a support carriage, leaning the sheet against upright support rollers which are inclined at small angle to the vertical and which with said support carriage constitute the conveyor, and heating a marginal band of the said one face of the sheet constituting said peripheral zone to cause the bending of the sheet to said stable anticlastic shape of the sheet.

5. A method according to claim 4, comprising heating the marginal band by moving the sheet on the conveyor past heating means located between the upright support rollers.

6. A method according to claim 3 or claim 4, comprising pre-heating a peripheral zone of the sheet before loading the sheet on to the conveyor.

7. A method according to claim 3 or claim 4, comprising pre-heating a peripheral zone of the sheet before loading the sheet on to the conveyor, by supporting the sheet in proximity to radiant electrical heating elements which heat that zone of the sheet.

8. In a method of advancing a glass sheet through contact of a conveyor therewith, the improvement comprising:
    cooling a central area of the glass sheet at a rate to differentially cool said central area relative to a peripheral zone of the sheet to bend the sheet to a stable anticlastic shape in which said sheet is arched away from the conveyor transversely of the direction of advance of the sheet and in which said sheet has a reverse curvature along the direction of its advance whereby the leading and trailing edges of the sheet are bent away from the conveyor.

9. A method of transporting a glass sheet comprising:
    contacting the glass sheet with a conveyor;
    bending the sheet to an anticlastic shape by heating a peripheral zone of the glass sheet at a rate to differentially heat said peripheral zone relative to the central area of the glass sheet, said anticlastic shape being a stable one in which said sheet is arched away from the conveyor transversely of the direction of advance of the sheet and in which said sheet has a reverse curvature along the direction of its advance; and
    advancing the sheet with its leading edge out of contact with the conveyor.

10. A method of transporting a glass sheet comprising:
   contacting the glass sheet with a conveyor;
   bending the sheet to an anticlastic shape by cooling a central area of the glass sheet at a rate to differentially cool said central area relative to a peripheral zone of the sheet, said anticlastic shape being a stable one in which said sheet is arched away from the conveyor transversely of the direction of advance of the sheet and in which said sheet has a reverse curvature along the direction of its advance; and
   advancing the sheet with its leading edge out of contact with the conveyor.

* * * * *